United States Patent [19]

Riley

[11] 4,048,060

[45] Sept. 13, 1977

[54] TWO-STAGE HYDRODESULFURIZATION OF OIL UTILIZING A NARROW PORE SIZE DISTRIBUTION CATALYST

[75] Inventor: Kenneth L. Riley, Baton Rouge, La.

[73] Assignee: Exxon Research and Engineering Company, Linden, N.J.

[21] Appl. No.: 644,834

[22] Filed: Dec. 29, 1975

[51] Int. Cl.$^2$ ............................................. C10G 23/02
[52] U.S. Cl. ..................................... 208/210; 208/216
[58] Field of Search ........................... 208/210, 216, 89

[56] References Cited

U.S. PATENT DOCUMENTS

| | | | |
|---|---|---|---|
| 3,696,027 | 10/1972 | Bridge | 208/210 |
| 3,841,995 | 10/1974 | Bertolacini et al. | 208/210 |
| 3,902,991 | 9/1975 | Christensen et al. | 208/210 |

*Primary Examiner*—George Crasanakis
*Attorney, Agent, or Firm*—Marthe L. Gibbons

[57] ABSTRACT

A two-stage hydrotreating process is provided in which a heavy hydrocarbon feed is treated with hydrogen and a small pore catalyst in a first zone and the hydrotreated hydrocarbon product is treated in a second zone with hydrogen and a larger pore catalyst having a specific pore size distribution.

23 Claims, 5 Drawing Figures

RELATIONSHIP BETWEEN PORE SIZE AND VANADIUM REMOVAL SELECTIVITY

TWO STAGE HYDRODESULFURIZATION OF OIL UTILIZING A NARROW PORE SIZE DISTRIBUTION CATALYST

BACKGROUND OF THE INVENTION

1. Field of the Invention

The present invention relates to a two-stage hydrotreating process in which a heavy hydrocarbon feed is contacted in a first hydrotreating zone with hydrogen and a relatively small pore size catalyst and the hydrotreated hydrocarbon is subsequently contacted with hydrogen in a second hydrotreating zone with hydrogen and a larger pore size catalyst having a specific pore size distribution. More particularly, the invention relates to a two-stage hydrodesulfurization and hydrodemetallization process utilizing a different catalyst in each stage.

2. Description of the Prior Art

Hydrodesulfurization processes in which heavy hydrocarbon distillates or residual fractions are hydrotreated with hydrogen in the presence of a catalyst comprising a hydrogenation component composited with a refractory oxide support, such as alumina, are well known (see for example, U.S. Pat. Nos. 3,531,389; 3,509,044 and 3,770,618).

When it is desired to decrease the sulfur content of high sulfur-containing heavy hydrocarbon feed to a low level, such as, for example to 0.3 weight percent sulfur, large amounts of the conventional catalysts must be utilized. Atlernatively, a high treating temperature would favor desulfurization, however, when a heavy hydrocarbon oil containing large amounts of asphaltenes, metal contaminants and sulfur is used as feed, high start of process run temperatures are usually avoided because they favor the formation of carbonaceous material which deposits on the catalyst and which thereby rapidly decreases the catalytic activity.

Multi-stage processes of hydroprocessing have been proposed in an attempt to overcome some of the disadvantages of the one-stage processes. For example, U.S. Pat. No. 3,766.058 teaches a two-stage process for hydroprocessing a heavy hydrocarbon feedstock in which the second stage catalyst has a larger pore diameter than the first stage catalyst. U.S. Pat. No. 3,876,530 teaches a multi-stage catalytic hydrodesulfurization and hydrodemetallization of residual petroleum oil in which the initial stage catalyst has a relatively low proportion of hydrogenation metals and in which the final stage catalyst has a relatively high proportion of hydrogenation metals.

U.S. Pat. Nos. 3,876,523 and 3,891,541 teach processes for the hydrodemetallization and hydrodesulfurization of residual oils utilizing a catalyst having specific pore size distributions.

U.S. Pat. No. 3,907,668 teaches hydrodesulfurization of a sulfur-containing asphaltene-free petroleum distillate with a catalyst having a specific pore size distribution.

It has now been found that special advantages can be obtained by subjecting a heavy hydrocarbon oil to a two-stage hydrotreating process in which the second stage catalyst, which has a larger median pore radius than the first stage catalyst, has a critical pore size distribution.

SUMMARY OF THE INVENTION

In accordance with the invention, there is provided a process for hydrotreating a heavy hydrocarbon feed, which comprises: contacting said feed in a first treating zone with hydrogen and a first catalyst under hydrotreating conditions to produce a first hydrotreated hydrocarbon product, and contacting at least a portion of said first hydrotreated hydrocarbon product in a second treating zone with hydrogen and a second catalyst, said first catalyst having a median pore radius ranging from about 30 to about 60 Angstroms and said second catalyst having a median pore radius greater than the median pore radius of said first catalyst, the median pore radius of said second catalyst ranging from about 70 to about 95 Angstroms, said second catalyst having the following physical characteristics: a total pore volume between 0.45 and 1.50 ml/g; less than 0.05 ml/g pore volume in pores with radii greater than 100 Angstroms; at least 0.40 ml/g pore volume in pores with radii between said median pore radius of said second catalyst and from about 10 Angstroms above or below said median pore radius of said second catalyst; at least 75 percent of the pore volume of pores with radii between the median pore radius of said second catalyst and 10 Angstroms above or below the median pore radius of said second catalyst; less than 0.05 ml/g of the pore volume in pores with radii below 60 Angstroms; and a total surface area ranging between 130 and 500 square meters per gram.

The pore radius referred to herein is determined using a Mercury Penetration Porosimeter Model 915–2 manufactured by Micromeritics Corporation, Norcross, Ga. The surface tension of the mercury was taken as 474 dynes per centimeter at 25° C. and a contact angle of 140° was used. The calculation of pore volume distribution is similar to that used by ORR, Powder Technology, volume 3, 1969–70, pages 117–123. By "median pore radius" is intended herein that 50% of the pore volume is above the given radius and 50% of the pore volume is below the given radius. By the expression "10 Angstroms above or below the median pore radius" is intended that the radius can be plus or minus 10 Angstroms from the actual median pore radius of the given catalyst.

In one embodiment of the invention, the second stage catalyst has a high content of catalytically active hydrogenation component.

The second stage catalyst having the above stated narrow pore size distribution has been found to be particularly effective for demetallization of hydrocarbonaceous oils. The process of the present invention is particularly well suited as a pretreatment process for feeds to a conversion process such as catalytic cracking, hydrocracking, coking and the like since it combines the features of utilizing a high activity hydrodesulfurization catalyst in the first stage and a high activity hydrodemetallization catalyst in the second stage. It is well known that metal contaminants present in feeds for catalytic hydrocarbon conversion processes become deposited on the catalyst and that these metals act as catalyst poison.

DETAILED DESCRIPTION OF PREFERRED EMBODIMENTS

Figure 1:
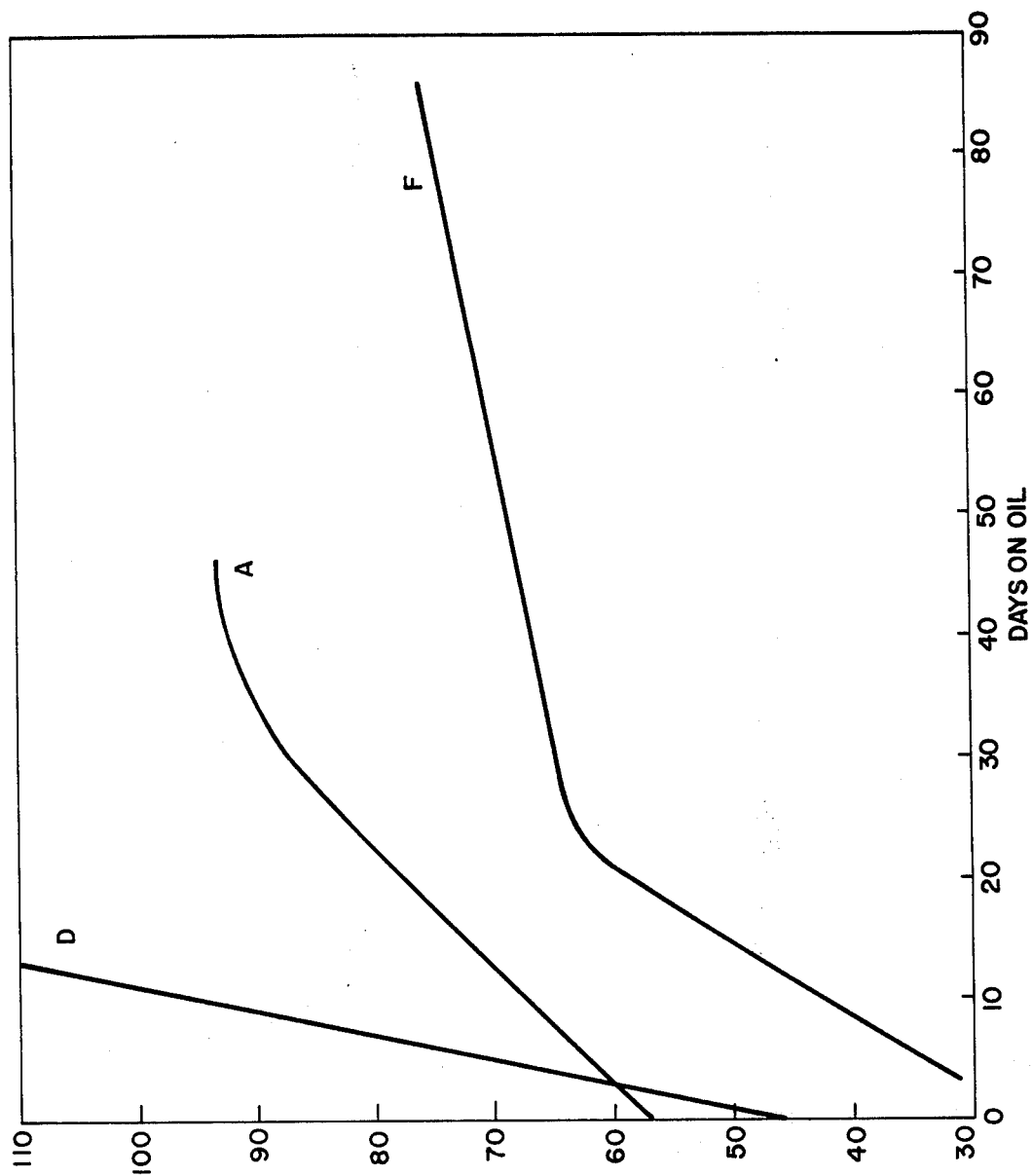
FIG. 1 is a graph comparing the temperature required to achieve 0.3 weight percent sulfur in liquid product versus days on oil for the second stage catalyst of the present invention (catalyst F) and conventional catalysts (catalysts A and D).

The process of the invention is a two-stage hydrotreating process in which a heavy hydrocarbonaceous feedstock is first treated with hydrogen in the presence of a first hydrotreating catalyst having relatively small pores and wherein at least a portion of the hydrotreated hydrocarbon product is further treated with hydrogen in a second hydrotreating zone in the presence of a second hydrotreating catalyst having a narrow and critical range of pore size distribution and relatively larger pores than the first stage catalyst.

By "hydrotreating process" is intended herein the contacting of the hydrocarbon feed with a catalyst in the presence of hydrogen and under selected conditions to remove heteroatoms, such as sulfur, nitrogen, oxygen and metallic contaminants such as nickel, vanadium and iron, from the feedstock and/or to saturate aromatic hydrocarbons, and/or olefinic hydrocarbons in the feedstock and/or to hydrocrack the feedstock. The process of the invention is particularly well suited for hydrodesulfurization and hydrodemetallization of asphaltene-containing heavy sulfur-bearing mineral oils which usually also contain a high content of metallic contaminants.

HEAVY HYDROCARBON FEEDSTOCKS

The heavy hydrocarbon feedstocks utilized in the present invention comprise hydrocarbons boiling above 650° F. (at atmospheric pressure) which contain substantial quantities of material boiling above 1000° F. The process is particularly suited for treating heavy crude mineral oils, residual petroleum oil fractions such as fractions produced by atmospheric and vacuum distillation of crude oil. Such residual oils usually contain large amounts of asphaltenes and sulfur and metallic contaminants such as nickel and vanadium. Total metal contents of such oils may range up to 2000 weight parts per million or more and the sulfur contents may range up to 8 weight percent or more. The Conradson carbon residue of these heavy hydrocarbon feeds will generally range from about 5 to about 50 weight percent (as to Conradson carbon, see ASTM test D189-65). The preferred process feedstock is a petroleum residuum obtained from distillation or other treating or separation process. From about 30 to about 100 percent of the petroleum residuum feed boils above 900° F. (at atmospheric pressure). Other suitable feedstocks include heavy hydrocarbons recovered from tar sands; synthetic crude oils recovered from oil shales; heavy oils produced from the liquefaction of coal and the like. The hydrocarbon feeds will generally contain at least 10 percent of materials boiling above 1000° F. (at atmospheric pressure).

OPERATING CONDITIONS IN THE FIRST HYDROTREATING ZONE

The operating conditions for the first hydrotreating zone are summarized in the following table:

| CONDITIONS | BROAD RANGE | PREFERRED RANGE |
|---|---|---|
| Temperature, ° F. | 600–850 | 650–800 |
| Pressure, psig | 600–3500 | 800–3200 |
| Liquid Hourly Space Velocity V/V/Hr. | 0.05–5.0 | 0.10–2.5 |
| Hydrogen Rate, SCF/bbl | 300–20,000 | 600–12,000 |
| Hydrogen Partial Pressure, psig | 500–3000 | 800–2500 |

When the process is conducted under hydrodesulfurization conditions, with a sulfur-containing heavy hydrocarbon oil, the feed is treated in the first hydrodesulfurization zone for a time sufficient to effect between about 35 to about 90 weight percent desulfurization, preferably not more than 88 percent desulfurization of the feed. Subsequently, the partially desulfurized hydrocarbon product is treated in the second hydrodesulfurization zone to effect a total desulfurization between 50 to 99.9 weight percent based on the feed to the first hydrodesulfurization zone.

FIRST HYDROTREATING CATALYST

The hydrotreating catalyst utilized in the first hydrotreating zone may comprise any conventional hydrotreating catalyst having a smaller median pore size radius than the catalyst utilized in the second hydrotreating zone. Preferably the first hydrotreating zone catalyst has more than 75% of its pore volume in pores having radii ranging between the median pore radius of the catalyst and 10 Angstroms plus or minus the median pore radius of the catalyst. More preferably, the first hydrotreating zone catalyst has less than 0.05 ml/g pore volume in pores with radii greater than 100 Angstroms. Generally, these catalysts comprise a hydrogenation component comprising at least one Group VIB metal component and at least one Group VIII metal component composited with a refractory support. The Groups VIB and VIII referred to herein are groups of the Periodic Table of Elements. The Periodic Table referred to herein is in accordance with the *Handbook of Chemistry and Physics* published by the Chemical Rubber Publishing Company, Cleveland, Ohio, 45th Edition, 1964. A preferred catalyst for use in the first hydrotreating zone of the present invention has a median pore radius ranging from about 30 to about 60 Angstroms. A particularly preferred catalyst comprises the oxide or sulfide of a Group VIB metal and the oxide or sulfide of a Group VIII metal deposited upon a support material comprising a silica-stabilized alumina containing 1 to 6 weight percent silica, the catalyst having a surface area of at least 150 square meters per gram and more than 80 percent of its pore volume in pores having radii ranging from about 25 to about 45 Angstroms. The active metallic components in the particularly preferred catalysts are a Group VIB oxide or sulfide, specifically a molybdenum or tungsten oxide or sulfide selected from the group consisting of molybdenum oxide, molybdenum sulfide, tungsten oxide, tungsten sulfide and mixtures thereof and a Group VIII oxide or sulfide, specifically a nickel or cobalt oxide or sulfide selected from the group consisting of nickel oxide, cobalt oxide, nickel sulfide, cobalt sulfide and mixtures thereof. The preferred active metal components are nickel oxide with molybdenum oxide and cobalt oxide with molybdenum oxide. The oxide catalysts are preferably sulfided prior to use. The preferred catalysts and methods for preparing these catalysts are disclosed in U.S. Pat. Nos. 3,770,618 and 3,509,044, the teachings of which are hereby incorporated by reference.

The operating conditions in the second hydrotreating zone fall substantially in the same ranges as the conditions listed for the first hydrotreating zone.

At least a portion of the hydrotreated hydrocarbon product resulting from the first hydrotreating zone is subsequently treated in the second hydrotreating zone. If desired, hydrogen sulfide produced in the first hydrotreating zone may be separated from the hydrotreated product before passing the product to the second hydrotreating zone. However, it is not necessary to remove the $H_2S$ from the hydrotreated product of the first reaction zone before subjecting the project to the second hydrotreating zone.

The hydrogen-containing treating gas is recycled to the hydrotreating zones, usually after removal of hydrogen sulfide.

THE SECOND HYDROTREATING CATALYST

The catalyst utilized in the second hydrotreating zone has a median pore radius greater than the median pore radius of the first hydrotreating zone catalyst. The median pore radius of the second hydrotreating catalyst will generally range from about 70 to about 95 Angstroms and has the following physical characteristics shown in Table I.

The second hydrotreating catalyst comprises a hydrogenation component comprising a Group VIB metal component and a Group VIII metal component composited with a refractory support. A preferred second hydrotreaating catalyst comprises a hydrogenation component selected from the group consisting of at least one elemental metal, metal oxide, or metal sulfide of a Group VIB metal and at least one elemental metal, metal oxide or metal sulfide of a Group VIII metal wherein the Group VIB metal, calculated as the oxide thereof, based on the total catalyst, is present in an amount of at least 8 weight percent, preferably from about 8 to about 25 weight percent, more preferably from about 14 to 20 weight percent, and wherein the Group VIII metal component, calculated as the metal oxide, based on the total catalyst, is present in an amount of at least 2.5 weight percent, preferably from about 2.5 to about 15 weight percent, more preferably from about 3.5 to about 6.5 weight percent. The preferred Group VIB component is selected from the group consisting of molybdenum oxide, molybdenum sulfide, tungsten oxide and tungsten sulfide and mixtures thereof and a preferred Group VIII metal component is selected from the group consisting of nickel oxide, nickel sulfide, cobalt oxide, cobalt sulfide, and mixtures thereof. The oxide catalysts are preferably sulfided prior to use in a conventional way.

TABLE II

| Second Stage Catalyst Composition | Broad Range | Preferred Range |
|---|---|---|
| Nickel or cobalt as oxide, wt.% | 2.5–15 | 3.5–6.5 |
| Tungsten or molybdenum as oxide, wt.% | 8–25 | 14–20 |
| Alumina | Balance | Balance |

The catalyst may be prepared in a conventional manner, for example, by impregnating an alumina-containing support having the desired physical characteristics with salts of the desired hydrogenation metals. Methods for preparing the alumina supports are well known in the art. The alumina support may further contain minor amounts of silica.

EXAMPLE

A series of comparative runs was conducted utilizing catalysts containing molybdenum and cobalt composited with an alumina support having varying physical characteristics. The characteristics of the catalysts, designated herein catalysts A, B, C, D, E, F, G, H, I, J, K, L are tabulated in Table III. Catalysts designated F, J, K and L are suitable second hydrotreating stage catalysts for the process of the present invention.

TABLE I

| CHARACTERIZATON OF CATALYST PORE SIZE DISTRIBUTION | | | | | | |
|---|---|---|---|---|---|---|
| | Broad Range | | Preferred | | More Preferred | |
| | Minimum | Maximum | Minimum | Maximum | Minimum | Maximum |
| Surface Area, m²/g | 130 | 500 | 132 | 200 | 135 | 175 |
| Pore Volume, ml/g | 0.45 | 1.50 | 0.48 | 1.00 | 0.50 | 0.60 |
| Median Pore Radius, Å | 70 | 95 | 75 | 90 | 78 | 86 |
| Pore Volume Distribution | | | | | | |
| PV above 100 Å Radius, ml/g | 0 | 0.050 | 0 | 0.040 | 0 | 0.035 |
| PV between $R_m \pm$ 10 Å, ml/g | 0.40 | 1.00 | 0.41 | 0.80 | 0.42 | 0.60 |
| % PV between $R_m \pm$ 10 Å, % | 75 | 99 | 80 | 98 | 81 | 96 |
| PV below 60 Å Radius, ml/g | 0 | 0.050 | 0 | 0.040 | 0 | 0.035 |

TABLE III

| | CATALYST INSPECTIONS | | | | | | | | | | | |
|---|---|---|---|---|---|---|---|---|---|---|---|---|
| Catalyst No. | A | B | C | D | E | F | G | H | I | J | K | L |
| Chemical Composition: | | | | | | | | | | | | |
| % CoO (NiO) | 2.9 | 2.9 | 2.9 | 3.0(NiO) | 4.5 | 4.5 | 4.0 | 4.0(NiO) | 4.0 | 4.0 | 4.5 | 3.5(NiO) |
| %MoO₃ | 20.7 | 20.7 | 20.7 | 18.0 | 16.0 | 16.0 | 12.0 | 12.0 | 12.0 | 12.0 | 16.0 | 16.1 |
| %SiO₂ | — | — | — | — | — | — | 1.0 | — | — | — | — | — |
| %Al₂O₃ | Bal. | Bal. | Bal. | Bal. | Bal. | Bal. | Bal. | Bal. | Bal. | Bal. | Bal. | Bal. |
| Physical Properties: | | | | | | | | | | | | |
| BET Surface Area, m²/g | 177 | 153 | 188 | 151 | 161 | 137 | 270 | 197 | 161 | 159 | 154 | 144 |
| Total Pore Volume, ml/g | 0.49 | 0.565 | 0.50 | 0.46 | 0.65 | 0.525 | 0.47 | 0.525 | 0.53 | 0.58 | 0.52 | 0.536 |
| Pore Size Distribution: | | | | | | | | | | | | |

TABLE III-continued

| Catalyst No. | A | B | C | D | E | F | G | H | I | J | K | L |
|---|---|---|---|---|---|---|---|---|---|---|---|---|
| Median Pore Radius, Å | 80 | 90 | 69 | 55 | 88 | 84 | 35 | 60 | 69 | 79 | 73 | 84 |
| Pore Volume Distribution: | | | | | | | | | | | | |
| P.V. above 100 Å Radius, ml/g | 0.04 | 0.155 | 0.030 | 0.020 | 0.20 | 0.025 | 0.02 | 0.020 | 0.020 | 0.030 | 0.023 | 0.025 |
| P.V. betwen $R_m \pm$ 10 Å, ml/g | 0.275 | 0.220 | 0.315 | 0.305 | 0.20 | 0.435 | 0.435 | 0.455 | 0.485 | 0.500 | 0.445 | 0.454 |
| % P.V. between $R_m \pm$ 10 Å | 56.1 | 39.0 | 63.0 | 66.3 | 30.8 | 82.9 | 92.6 | 86.7 | 81.5 | 86.2 | 85.6 | 84.7 |
| P.V. below 60 Å Radius, ml/g | 0.095 | 0.060 | 0.125 | 0.325 | 0.11 | 0.015 | 0.44 | 0.25 | 0.025 | 0.02 | 0.03 | 0.022 |

Before testing, all of the catalysts were presulfided in a conventional way. The feed was prepared as follows to simulate a second stage feedstock: Initially a Safaniya atmospheric residuum (Heavy Arabian) containing 3.6 weight % sulfur was treated over catalyst G, which is a suitable first stage catalyst. The characteristics of this atmospheric residuum are given in Table IV. The resulting product from this operation was collected and used as a feed for the subsequent two-stage experiments. The feedstock used to generate the data recorded in FIGS. 1, 2, 3, 4 and 5 is given in Table V. All the results were obtained on feedstock number 2. The runs were carried out such that, after sulfiding, the residuum feedstock was added to the reactor, feed rate, pressure and gas rates set, and the temperature adjusted each day so as to maintain approximately a 0.3 weight percent sulfur product.

TABLE IV
FEEDSTOCK INSPECTIONS

| | Safaniya Atmospheric Residuum |
|---|---|
| Feedstock No. | 1 |
| Gravity, ° API at 60° F. | 13.9 |
| Sulfur, Wt. % | 3.61 |
| Carbon, Wt. % | 84.92 |
| Hydrogen, Wt. % | 11.14 |
| Nitrogen, Wt. % | 0.269 |
| Oxygen, Wt. % | — |
| Conradson Carbon, Wt. % | 12.0 |
| Aniline Pt., ° F. | — |
| RI at 67° C. | — |
| Bromine No., gm/100 gm | 5.9 |
| Flash Point, ° F. | — |
| Pour Point, ° F. | — |
| Viscosity, at | |
| 122° F. SSF | — |
| 130° F. SSU | — |
| 140° F. SSF | — |
| 210° F. SSU | — |
| 1160 ASTM Distillation at 1 mm | |
| IBP, ° F. | 445 |
| 5% at ° F. | 584 |
| 10% at ° F. | 642 |
| 20% at ° F. | 743 |
| 30% at ° F. | 829 |
| 40% at ° F. | 901 |
| 50% at ° F. | 995 |
| 60% at ° F. | — |
| 70% at ° F. | — |
| 80% at ° F. | — |
| 90% at ° F. | — |
| 95% at ° F. | — |
| FBP, ° F. | 1050 |
| Rec., % | 58 |
| Res., % | 42 |
| V, ppm | 88 |
| Ni, ppm | 20 |
| Fe, ppm | 4 |
| Asphalt., $C_5$ Insoluble, Wt. % | 21.6 |
| Asphalt, $C_7$ Insoluble, Wt. % | — |
| Particulates, ppm (Toluene Insoluble) | — |

TABLE V
FEEDSTOCK INSPECTIONS

| | Safaniya Hydrotreated A.R. |
|---|---|
| Feedstock No. | 2 |
| Gravity, ° API at 60° F. | 19.3 |
| Sulfur, Wt. % | 0.98 |
| Carbon, Wt. % | 86.80 |
| Hydrogen, Wt. % | 12.05 |
| Nitrogen, Wt. % | 0.1735 |
| Oxygen, Wt. % | — |
| Conradson Carbon, Wt. % | 7.0 |
| Aniline Pt., ° F. | — |
| RI at 67° C. | — |
| Bromine N l., gm/100 gm | — |
| Flash Point, ° F. | — |
| Pour Point, ° F. | — |
| Viscosity, at | |
| 122° F. SSF | — |
| 130° F. SSU | — |
| 140° F. SSF | — |
| 210° F. SSU | — |
| 1160 ASTM Distillation at 1 mm | |
| IBP, ° F. | 525 |
| 5% at ° F. | 571 |
| 10% at ° F. | 636 |
| 20% at ° F. | 724 |
| 30% at ° F. | 829 |
| 40% at ° F. | 877 |
| 50% at ° F. | 943 |
| 60% at ° F. | 1036 |
| 70% at ° F. | — |
| 80% at ° F. | — |
| 90% at ° F. | — |
| 95% at ° F. | — |
| FBP, ° F. | 1050 |
| Rec., % | 63 |
| Res., % | 37 |
| V, ppm | 53.4 |
| Ni, ppm | 17.6 |
| Fe, ppm | 0.0 |
| Asphalt., $C_5$ Insoluble Wt. % | 11.3 |
| Asphalt, $C_7$ Insoluble, Wt. % | 8.5 |
| Particulates, ppm (Toluene Insoluble) | 7.10 |

The results of these tests are summarized in FIGS. 1, 2, 3, 4 and 5.

Figure 2:
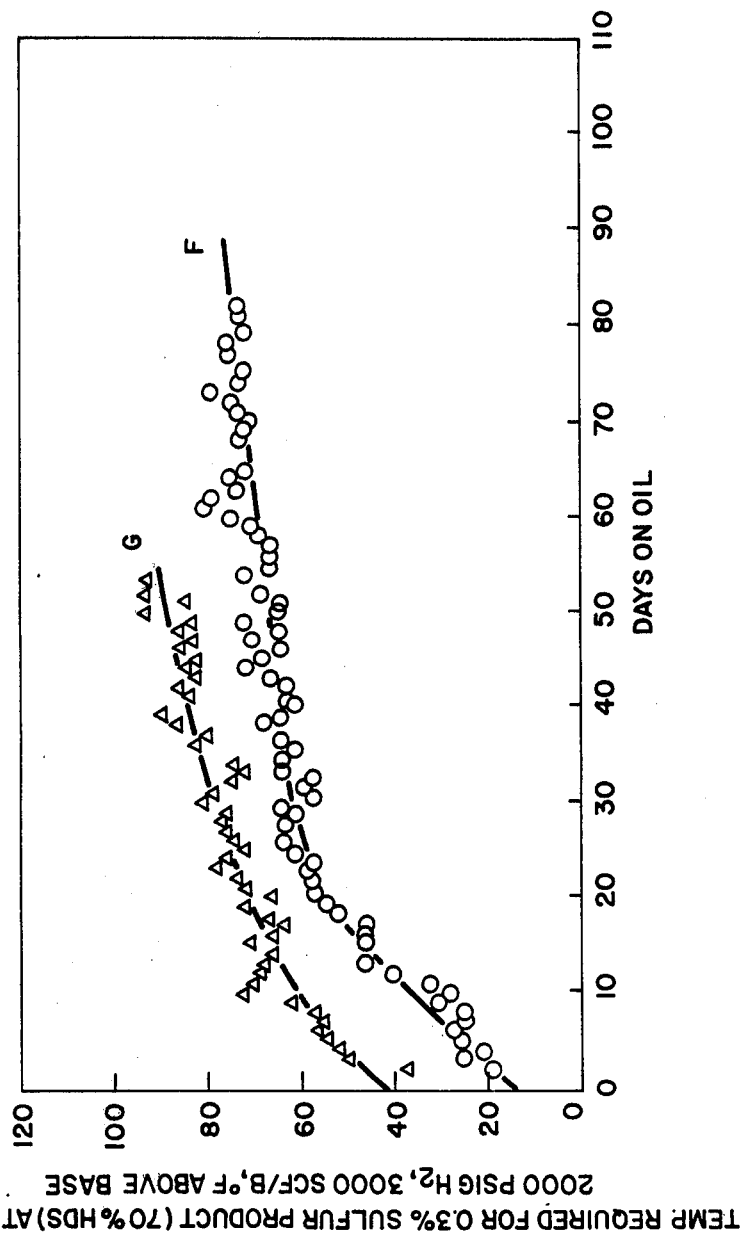
FIG. 2 is a graph comparing the temperature required to achieve 0.3 weight percent sulfur in liquid product versus days on oil for the second stage catalyst of the present invention (catalyst F) and a conventional catalyst (catalyst G).

FIG. 1 shows comparative results utilizing catalyst F (which is a second stage catalyst of the present invention) with catalysts A and D which are conventional catalysts. FIG. 2 shows the comparative results between catalyst G, which is a suitable first stage catalyst, with catalyst F, which is a second stage catalyst of the present invention.

It should be noted that catalyst A has a median pore radius which falls within the range of the second stage catalyst of the present invention; however, catalyst A does not have the same narrowness index as that required for the second stage catalyst of the present invention. The term "narrowness index" is used herein to designate the pore volume contained in the region which includes the median pore radius and has the limits 10 Angstroms above and 10 Angstroms below the median value. Moreover, catalyst A has more of its pore volume in pores less than 60 Angstroms radius than is desired. Catalyst D is a smaller pore catalyst which has been heretofore typically used as first stage hydrocracking pretreatment catalyst.

Figure 3:
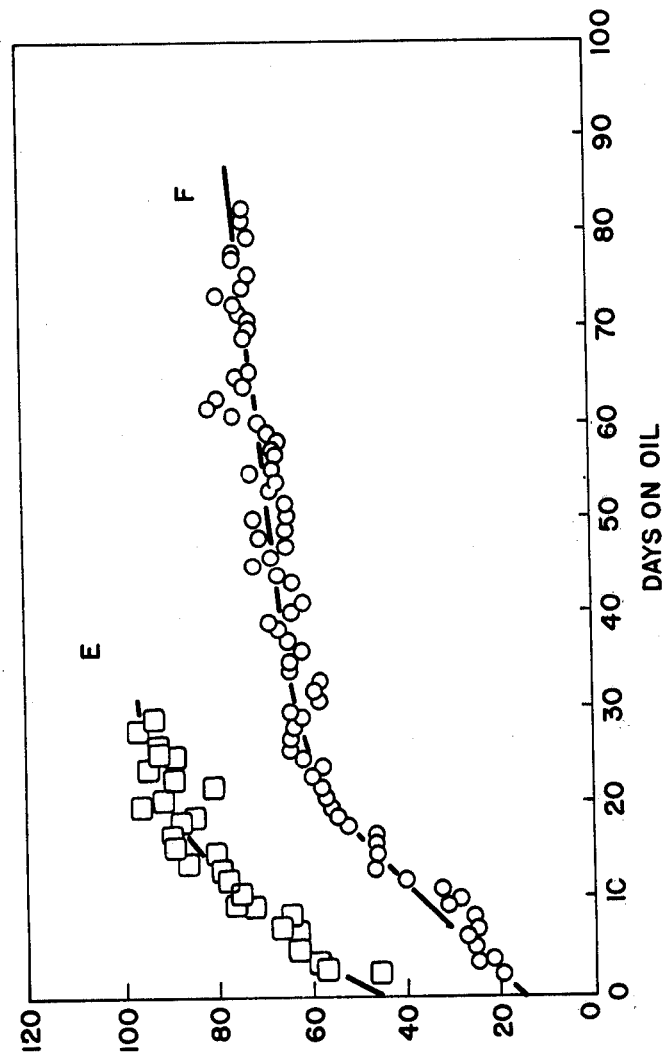
FIG. 3 is a graph comparing the effect of pore size distribution at approximately the same median pore diameter for a second stage catalyst of the present invention (catalyst F) and a conventional catalyst (catalyst E) on temperature required to achieve 0.3 weight percent sulfur in liquid product versus days on oil.

FIG. 3 shows a comparison, at approximately the same pore diameter, of the effect of pore size distribution (narrowness index). Catalyst E was prepared on an alumina having an identical chemical composition as catalyst F, the only difference being in pore size distribution. Metals were added to the aluminas in identical fashions. The superior performance of the narrow pore distribution catalyst, F, should be noted.

Figure 4:
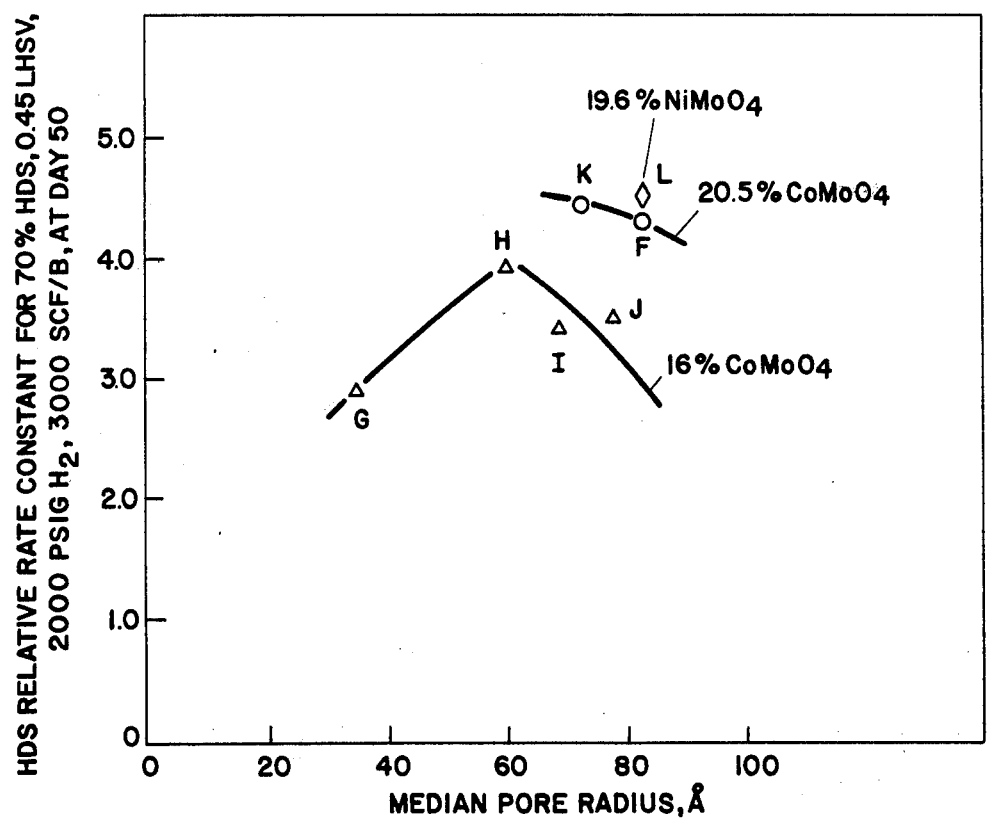
FIG. 4 is a graph showing the effect of pore radius and metals level on hydrodesulfurization activity of the second stage catalyst of the present invention (catalysts L, F, J, K) and conventional catalysts (G, H and I).

FIG. 4 shows the effect of median pore radius and metals level on hydrodesulfurization activity. These data show that an optimum median pore radius for hydrodesulfurization occurs at about 60 Angstrom radius. To improve hydrodesulfurization activity, additional metals were added to bring the total $CoMoO_4$ content from 16 weight percent to approximately 20 weight percent. This had the effect of increasing hydrodesulfurization activity to a value greater than found at the optimum median pore radius value.

Figure 5:
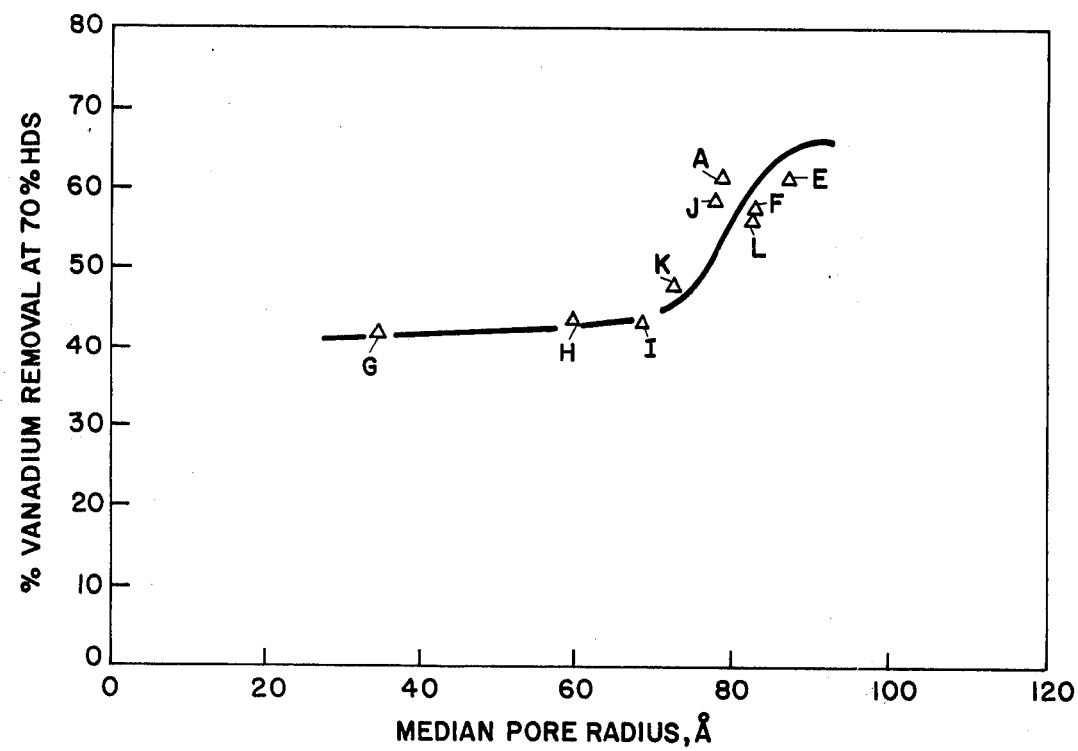
FIG. 5 is a graph showing the effect of median pore radius on vanadium removal selectively for the second stage catalyst of the present invention (catalysts F, J, L, K) and conventional catalysts (G, H, I, E).

FIG. 5 shows the vanadium removal selectivity of catalysts having median pore radii ranging between 70 and 95 Angstroms. For median pore radii of less than 70 Angstroms, it can be seen that the present vanadium removal at 70% sulfur removal is approximately constant and not influenced by the median pore radius; however, between 70 and 95 Angstroms, there is a significant improvement in metals removal selectivity. The 70 to 95 Angstroms median pore radii gives a good compromise between desulfurization and demetallization activity. The effect of pore radius on percent vanadium removal was unexpected. It would be anticipated that a much smoother relationship would occur. It should be noted that median pore radius seems to be more important than narrowness of pore size distribution for hydrodemetallization activity. The narrowness index appears to influence desulfurization, as can be seen in FIGS. 1 and 3, to a much greater extent.

The results of the above indicated experiments show that the second stage catalyst of the present invention was selected with a very narrow pore size distribution so as to give superior desulfurization performance and a narrow region of median pore radius so as to give enhanced demetallization performance. These two effects were balanced so as to achieve optimum performance for a given hydrodesulfurization and hydrodemetallization process.

What is claimed is:

1. A process for hydrodesulfurizing a sulfur and metal-containing heavy hydrocarbon feed, which comprises:
    a. contacting said feed in a first hydrodesulfurization zone with hydrogen and a first catalyst under hydrodesulfurization conditions to produce a first hydrodesulfurized hydrocarbon product, said first catalyst comprising an oxide or a sulfide of a Group VIB metal and an oxide or a sulfude of a Group VIII metal deposited on an alumina support, said first catalyst having a median pore radius being in the range from about 30 to about 60 Angstroms, and
    b. contacting at least a portion of said first hydrodesulfurized hydrocarbon product in a second hydrodesulfurization zone with hydrogen and a second catalyst under hydrodesulfurization conditions, said second catalyst having a median pore radius greater than said first catalyst, the median pore radius of said second catalyst being in the range from about 70 to about 95 Angstroms, said second catalyst comprising a hydrogenation component selected from the group consisting of at least one elemental metal, metal oxide or metal sulfide of a Group VIB metal and at least one elemental metal, metal oxide or metal sulfide of a Group VIII non-noble metal, said hydrogenation component being composited with an alumina support, said second catalyst having the following physical characteristics: a total pore volume between 0.45 and 1.50 ml/g; less than 0.05 ml/g pore volume in pores with radii greater than 100 Angstroms; at least 0.40 ml/g pore volume having a narrowness index in pores with radii between said median pore radius of said second catalyst and from about 10 Angstroms above and 10 Angstroms below said median pore radius of said second catalyst, at least 75% of the pore volume of said second catalyst having said narrowness index with radii between the median pore radius and 10 Angstroms above and 10 Angstroms below said median pore radius of said second catalyst; less than 0.05 ml/g of the pore volume in pores with radii below 60 Angstroms, and a total surface area ranging between 130 and 500 square meters per gram.

2. The process of claim 1 wherein said second catalyst has the following physical characteristics:

Surface Area, $m^2/g$: 130 to 500
Pore Volume, ml/g: 0.45 to 1.50
Median Pore Radius, A: 70 to 95
Pore Volume Distribution:
PV above 100A radius, ml/g: 0 to 0.05
PV between $R_m$ +10A above and 10A below, ml/g: 0.40 to 1.00
% PV between $R_m$ +10A above and 10A below, %: 75 to 99
PV below 60A radius, ml/g: 0 to 0.050

3. The process of claim 1 wherein said second catalyst has the following physical characteristics:

Surface Area, $m^2/g$: 132 to 200
Pore Volume, ml/g: 0.48 to 1.00
Median Pore Radius, A: 75 to 90
Pore Volume Distribution:
PV above 100A radius, ml/g: 0 to 0.04
PV between $R_m$ +10A above and 10A below, ml/g: 0.41 to 0.80
% PV between $R_m$ +10A above and 10A below, %: 80 to 98
PV below 60A radius, ml/g; 0 to 0.04.

4. The process of claim 1 wherein said second catalyst has the following physical characteristics:

Surface Area, $m^2/g$: 135 to 175
Pore Volume, ml/g: 0.50 to 0.60
Median Pore Radius, A: 78 to 86
Pore Volume Distribution:
PV above 100A radius, ml/g: 0 to 0.035
PV between $R_m$ +10A above and 10A below, ml/g: 0.42 to 0.60
% PV between $R_m$ +10A above and 10A below, %: 81 to 96
PV below 60A radius, ml/g: 0 to 0.035.

5. The process of claim 1 wherein in said second catalyst said Group VIB metal, calculated as the oxide thereof, comprises at least 8 weight percent of the total second catalyst and wherein said Group VIII metal, calculated as the oxide thereof, comprises at least 2.5 weight percent of the total second catalyst.

6. The process of claim 1 wherein in said second catalyst said Group VIB metal, calculated as the oxide thereof, comprises at least 14 weight percent of the total second catalyst and wherein said Group VIII metal, calculated as the oxide thereof, comprises at least 3.5 weight percent of the total second catalyst.

7. The process of claim 1 wherein in said second catalyst said Group VIB metal is selected from the group consisting of molybdenum oxide, molybdenum sulfide, tungsten oxide, tungsten sulfide and mixtures thereof and wherein said Group VIII is selected from the group consisting of nickel oxide, cobalt oxide, nickel sulfide, cobalt sulfide and mixtures thereof.

8. The process of claim 1 wherein said first catalyst has more than 75 percent of its pore volume in pores having radii ranging between said median pore radius of the first catalyst and 10 Angstroms above and 10 Angstroms below the median pore radius of the first catalyst, and wherein said first catalyst has less than 0.05 ml/g pore volume in pores with radii greater than 100 Angstroms.

9. The process of claim 1 wherein said first catalyst has a surface area of at least 150 square meters per gram and more than 80 percent of its pore volume being in pores having radii ranging from about 25 to about 45 Angstroms.

10. The process of claim 1 wherein said hydrocarbon feed is a sulfur-containing feed and wherein said feed in said first hydrodesulfurization zone is desulfurized to a level ranging between about 35 to about 90 percent relative to the feed sulfur.

11. The process of claim 10 wherein the desulfurization level in said first hydrodesulfurization zone is limited to not more than 88 weight percent desulfurization based on the feed sulfur.

12. The process of claim1 wherein the hydrodesulfurization conditions in each of said hydrodesulfurization zones include a temperature ranging from about 600° to about 850° F., a pressure ranging from about 600 to about 3500 psig, a liquid hourly space velocity ranging from about 0.05 to about 5 volumes of hydrocarbon feed per hour per volume of catalyst, a hydrogen rate ranging from about 300 to about 20,000 standard cubic feet per barrel, and a hydrogen partial pressure ranging from about 500 to about 3000 psig.

13. A process for hydrodesulfurizing and hydrodemetallizing a sulfur and metal-containing heavy hydrocarbon feed, which comprises:
  a. contacting said feed in a first hydrodesulfurization zone with hydrogen and a first hydrodesulfurization catalyst under hydrodesulfurization conditions to effect a 35 to about 85 percent desulfurization of said feed and thereby produce a partially desulfurized hydrocarbon product;
  b. contacting at least a portion of said partially desulfurized hydrocarbon product in a second hydrodesulfurization zone with hydrogen and a second catalyst under hydrodesulfurization conditions, said second catalyst comprising a hydrogenation component composited with an alumina support, said hydrogenation component being selected from the group consisting of at least one elemental metal, metal oxide or metal sulfide of a Group VIB metal and at least one elemental metal, metal oxide or metal sulfide of a Group VIII non-noble metal, said second catalyst having a median pore radius ranging from about 70 to about 95 Angstroms and having the following physical characteristics: a total pore volume between 0.45 and 1.50 ml/g; less than 0.05 ml/g pore volume in pores with radii greater than 100 Angstroms; at least 0.40 ml/g pore volume in pores with radii between said median pore radius of said second catalyst and from 10 Angstroms above and 10 Angstroms below said median pore radius of said second catalyst; at least 75 percent of the pore volume in pores with radii between the median pore radius of said second catalyst and 10 Angstroms above and 10 Angstroms below the median pore radius of said second catalyst; less than 0.05 ml/g of the pore volume in pores with radii below 60 Angstroms, and a total surface area ranging between 130 and 500 square meters per gram.

14. The process of claim 13 wherein said first catalyst has a median pore radius ranging from about 30 to about 60 Angstroms; more than 75 percent of its pore volume being in pores having radii ranging between said median pore radius of the first catalyst and about 10 Angstroms above and 10 Angstroms below said median pore radius of the first catalyst, and said first catalyst having less than 0.05 ml/g pore volume in pores with radii greater than 100 Angstroms.

15. The process of claim 13 wherein the total effluent of the first hydrodesulfurization zone is passed to said second hydrodesulfurization zone.

16. The process of claim 13 wherein the effluent of said first hydrodesulfurization zone comprises hydrogen sulfide and a partially desulfurized hydrocarbon product and wherein the hydrogen sulfide is separated from said partially desulfurized hydrocarbon product prior to said contacting step (b).

17. A process for hydrodesulfurizing a heavy hydrocarbon feed, which comprises:
  a. contacting said feed in a first hydrodesulfurization zone with hydrogen and a first catalyst under hydrodesulfurization conditions to produce a first hydrodesulfurized hydrocarbon product, said first catalyst comprising an oxide or sulfide of a Group VIB metal and an oxide or sulfide of a Group VIII metal composited with an alumina support material containing 1 to 6 weight percent silica, said first catalyst having a surface area of at least 150 square meters per gram and more than 80 percent of its pore volume in pores having radii ranging from about 25 to about 45 Angstroms; a median pore radius ranging from about 30 to about 60 Angstroms; more than 75 percent of its pore volume in pores having radii ranging between said median pore radius and about 10 Angstroms above and 10 Angstroms below said median pore radius, and less than 0.05 ml/g pore volume in pores with radii greater than 100 Angstroms, and
  b. contacting at least a portion of said first hydrodesulfurized hydrocarbon product in a second hydrodesulfurization zone with hydrogen and a second catalyst, said second catalyst comprising a hydrogenation component composited with an alumina support, said second catalyst having a median pore radius ranging from about 70 to about 95 Angstroms, a total pore volume between 0.45 and 1.5 ml/g; less than 0.05 ml/g pore volume in pores with radii greater than 100 Angstroms, at least 0.40 ml/g pore volume in pores with radii between the median pore radius of the second catalyst and from about 10 Angstroms above and 10 Angstroms below said median pore radius of said second catalyst, said second catalyst having at least 75 percent of the pore volume in pores with radii between the median pore radius of said second catalyst and 10 Angstroms above and 10 Angstroms below the median pore radius of said second catalyst, said second catalyst having less than 0.05 ml/g of the pore volume in pores with radii below 60 Angstroms and a total surface area ranging between 130 and 500 square meters per gram, the hydrogenation component of said second catalyst being selected from the group consisting of at least one elemental metal, metal oxide or metal sulfide of a Group VIB metal and at least one elemental metal or metal oxide or metal sulfide of a group VIII non-noble metal, said Group VIB metal being present in an amount of at least 14 weight percent, calculated as the metal oxide, based on the total catalyst and said Group VIII metal being present in an amount of at least 3.5 weight percent, calculated as the metal oxide, based on the total catalyst.

18. The process of claim 17 wherein said alumina support of said second catalyst additionally contains a minor amount of silica.

19. The process of claim 17 wherein the support of said second catalyst consists essentially of alumina.

20. The process of claim 1 wherein said alumina support of said first catalyst additionally contains from about 1 to about 6 weight percent silica.

21. The process of claim 1 wherein said alumina support of said second catalyst additionally contains a minor amount of silica.

22. The process of claim 1 wherein the temperature in said second hydrodesulfurization zone ranges from about 600° to about 850° F.

23. The process of claim 17 wherein the temperature in said second hydrodesulfurization zone ranges from about 600° to about 850° F.

* * * * *